United States Patent [19]

Taylor et al.

[11] Patent Number: 4,563,703
[45] Date of Patent: Jan. 7, 1986

[54] VIDEO PROCESSING SYSTEMS

[75] Inventors: Richard J. Taylor, London; Paul R. N. Kellar; Neil R. Hinson, both of Newbury, all of England

[73] Assignee: Quantel Limited, Kenley, England

[21] Appl. No.: 475,789

[22] Filed: Mar. 16, 1983

[30] Foreign Application Priority Data

Mar. 19, 1982 [GB] United Kingdom ............... 8208054

[51] Int. Cl.⁴ .................. H04N 5/14; H04N 9/535
[52] U.S. Cl. .................................... 358/160; 358/22
[58] Field of Search ............... 358/160, 180, 22, 183, 358/138, 140, 134; 382/44, 45, 46, 47

[56] References Cited

U.S. PATENT DOCUMENTS

| | | | |
|---|---|---|---|
| 3,976,982 | 8/1976 | Eiselen | 382/44 |
| 4,266,242 | 5/1981 | McCoy | 358/183 |
| 4,286,291 | 8/1981 | Taylor et al. | 358/138 |
| 4,309,723 | 1/1982 | Ryan | 358/163 |
| 4,334,245 | 6/1982 | Michael | 358/180 |
| 4,383,272 | 5/1983 | Netravali et al. | 358/138 |
| 4,437,121 | 3/1984 | Taylor et al. | 358/160 |
| 4,442,454 | 4/1984 | Powell | 358/135 |

Primary Examiner—John C. Martin
Assistant Examiner—David E. Harvey
Attorney, Agent, or Firm—Cooper, Dunham, Clark, Griffin & Moran

[57] ABSTRACT

A processing system includes a processor 10 and frame store 11. Both the frame store and processor are under the control of address mechanism 12. The addressing mechanism 12 can generate the desired information from address information which is only provided on some of the store locations and which is only updated over more than one frame period. The mechanism includes spatial and temporal address interpolators to effect this operation.

12 Claims, 9 Drawing Figures

SPATIAL AND TEMPORAL ADDRESS INTERPOLATION (a)
FRAMESTORE CELLS (b)

(c)

(d)

SPATIAL AND TEMPORAL
ADDRESS INTERPOLATION

4,563,703

VIDEO PROCESSING SYSTEMS

BACKGROUND TO THE INVENTION

The invention relates to a video processing system inter alia for use in special effects in television.

In known systems used for special effects for example video information is received by a framestore acting as a buffer and in order to produce the special effect desired, an ouput processor typically receives data from selected addresses within the framestore to reconstitute a picture of different shape or size to that input to the store.

Whilst such systems work over a limited range of special effects as currently available, the way in which they operate inhibits their flexibility.

An object of the invention is to provide a system capable of producing greater flexibility in picture manipulation whilst maintaining picture quality so that the resultant picture is not noticably degraded.

SUMMARY OF THE INVENTION

According to the invention there is provided a video processing system for picture shape manipulation comprising:

frame storage means for receiving picture point information in a plurality of locations equivalent to a video frame;

addressing means for addressing selected frame store locations a plurality of times within a frame period in dependence on the manipulation required;

processing means for processing the picture information at any given location each time that location is addressed; and control means for varying the processing provided in dependence on the density of the picture information at a given picture location within a frame period.

According to a further aspect of the invention there is provided an addressing mechanism for a framestore processing system comprising:

means for determining only selected ones of the desired framestore addresses required to be accessed;

means for updating the selected ones of the desired addresses at a rate slower than normal frame rate; and address interpolation means for calculating all the desired addresses to be accessed from the available address data in both spatial and temporal modes so that all the addresses to be accessed are available updated at normal frame rates.

BRIEF DESCRIPTION OF DRAWINGS

The invention will now be described with reference to the accompanying drawings in which.

DESCRIPTION OF PREFERRED EMBODIMENTS

Figure 1:
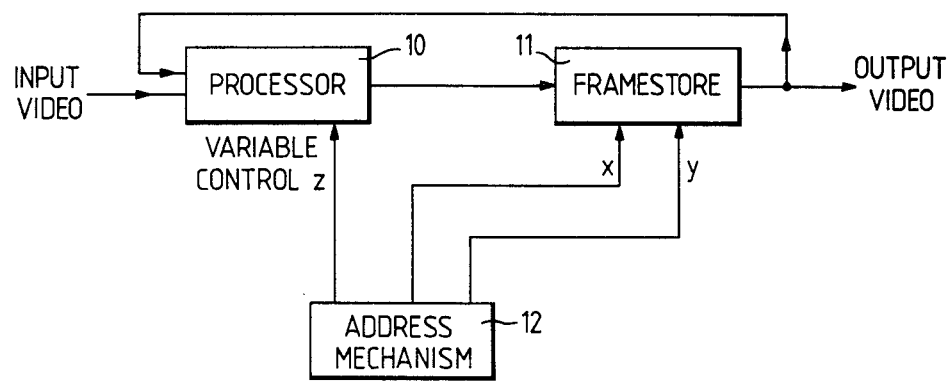
FIG. 1 shows a basic embodiment of the system relating to one aspect of the present invention.

A basic embodiment relating to one aspect of the invention is shown in FIG. 1. A processor 10 receives incoming picture information together with information previously stored in framestore 11. The x, y address used to access the framestore at a given picture point location is determined by the output of address mechanism 12. In addition a control parameter Z is provided by the address mechanism for controlling the processing within the processor 10.

The arrangement shown is a radical departure from known systems in that the address mechanism in effect defines the 'shape' of the image to be produced by a process which builds up a picture by accessing certain framestore locations more than once within the frame period so that effectively all the original picture points are arranged to go somewhere even though the locations will be different to their original pixel positions. In addition the address mechanism produces the control parameter to ensure that correct fractions of the picture points are added to the framestore.

Figure 2:
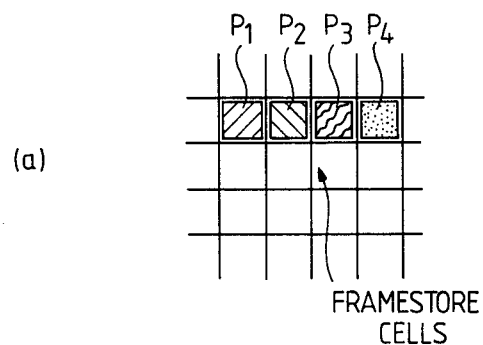
FIG. 2 shows various aspects of picture manipulation.
Figure 2:
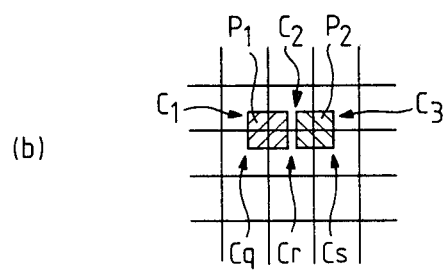
Figure 2:
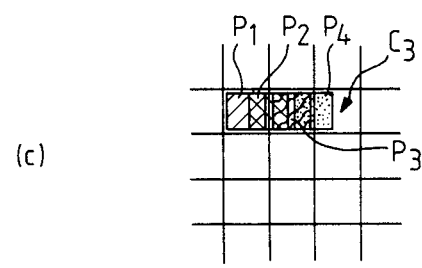
Figure 2:
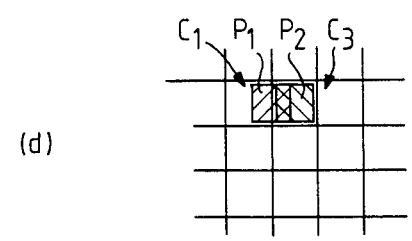

The processing and addressing mechanism will now be explained in more detail. The address and storage mechanism is more complicated than at first apparent in that we have devised a system whereby the picture points can be considered as part of a grid of cells and that these picture points need not be assigned solely to one cell but can have portions assigned to a number of cells as represented in FIG. 2. Thus a standard picture (without processing) made up of a plurality of picture points would be stored in successive cells within the framestore as represented by picture points $P_1$, $P_2$, $P_3$ and $P_4$ of FIG. 2(a), and the address mechanism 12 can be considered as producing a standard addressing sequence with the value of Z being fixed typically at a value equal to 1. Although only pixels $P_1$ to $P_4$ are shown it is clear that all the cells of the framestore would contain a pixel in this mode.

The representation of FIG. 2(b) shows the change in the picture points, where a picture (still of standard size) is scrolled horizontally and vertically by $\frac{1}{2}$ a picture point. For simplicity only $P_1$ and $P_2$ are shown. The pixels $P_1$ and $P_2$ can now be seen to each have four portions allocated to adjacent store cells. In practice the portion of a given pixel added to a cell is known from the x and y address provided by our address mechanism 12, which is arranged to produce a main address and remainder, the remainder giving the fraction allocated to a given cell and comprise the Z parameter.

Thus for FIG. 2b, the framestore 11 and processor 10 under the control of address mechanism 12 effectively initially receive pixel $P_1$ and after processing partially assign it to cells $C_1$ and $C_2$ and the appropriate cells on the next line $C_q$ and $C_r$. Pixel $P_2$ is then processed and placed in $C_2$, $C_3$, $C_r$ and $C_s$. The process in practice takes into account the information already alloted from pixel $P_1$ in cell $C_2$ for example so that this cell location is accessed for a read operation followed by the processing dependent on the value of Z provided and then the processed output is written into the store.

In practice where scrolling takes place without picture size change (zoom) then the portions of the adjacent pixels allocated to a cell will always add up to 1 at the end of the processing. In the FIG. 2(b) illustration, four read, processing and write operations will be required to produce the desired picture information with Z in this example being $\frac{1}{4}$.

Figure 3:
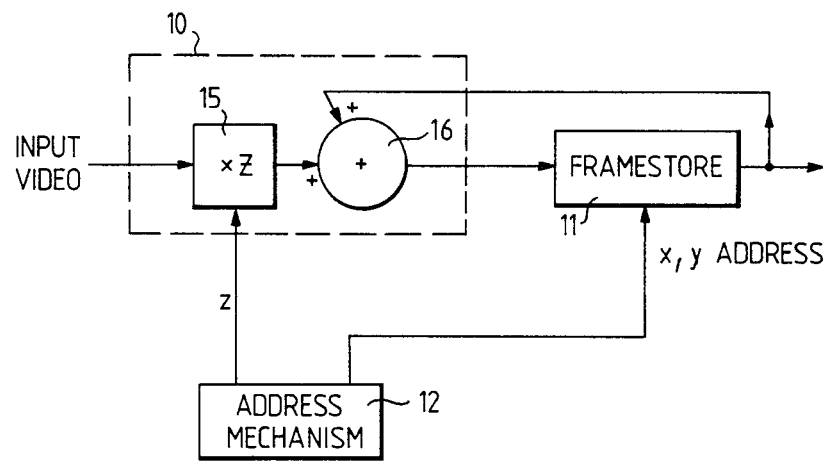
FIG. 3 shows the processing aspects of the system of FIG. 1 in more details.

An embodiment of the processor 10 suitable for providing the necessary basic picture manipulation is shown in FIG. 3.

A multiplier 15 receives the incoming information and after multiplying the information, this is passed to adder 16. The value of Z will always be chosen to be between 0 and 1.

In the example of 2(a) above as already explained, the value of Z can be considered as equal to 1 and in the 2(b) arrangement it will be $\frac{1}{4}$ since four quarters from adjacent pixels are used to generate the information within cell $C_2$. Thus providing the contents of the store is cleared to zero at the start of each picture the interpolation for generating the information for each cell is automatically achieved merely by the succession of read-process-write operations.

However, this mechanism is only suitable for scrolling as it stands, when there is a change in picture size then additional manipulation is required to avoid errors in picture build up, as now explained with reference to FIG. 2c. Here a 2:1 reduction in picture size is represented (without scroll) so that pixel $P_1$ is within cell $C_1$ and $P_2$ is partially within cell $C_1$ and $C_2$. Similarly $P_3$ is wholly within cell $C_2$ and $P_4$ is partly within $C_2$ and $C_3$. If some adjustment of the data quantity were not made then the resultant information within cell $C_2$, for example, would be twice that desired (considering picture intensity, for example). Thus it is necessary to provide the means of adjusting this situation and from FIG. 2(c) it can be seen that the adjustment value (K) is required to be $\frac{1}{2}$ to provide the desired adjustment at each cell.

Thus although this is a simple case, the general rule in fact follows this explanation in that K=compression ratio. Compression ratios of 32:1 have been successfully achieved. Although K can be considered as fixed for a given compression (e.g., K=$\frac{1}{3}$ for 3 times compression) the compression need not be the same across the entire picture and indeed variable compression gives rise to a host of special effects which can be achieved with the present system.

Although the mechanism for (read—add manipulated new picture point—write) in a single cycle may initially seem straightforward, in fact it is a very powerful tool which performs interpolation and filtering all in the one operation or sequence of operations without the need of elaborate additional devices.

Considering FIG. 2(d) it can be seen that compression and scrolling can be achieved by moving the addressing by $\frac{1}{2}$ pixel (only $P_1$ and $P_2$ are shown for simplicity).

Figure 4:
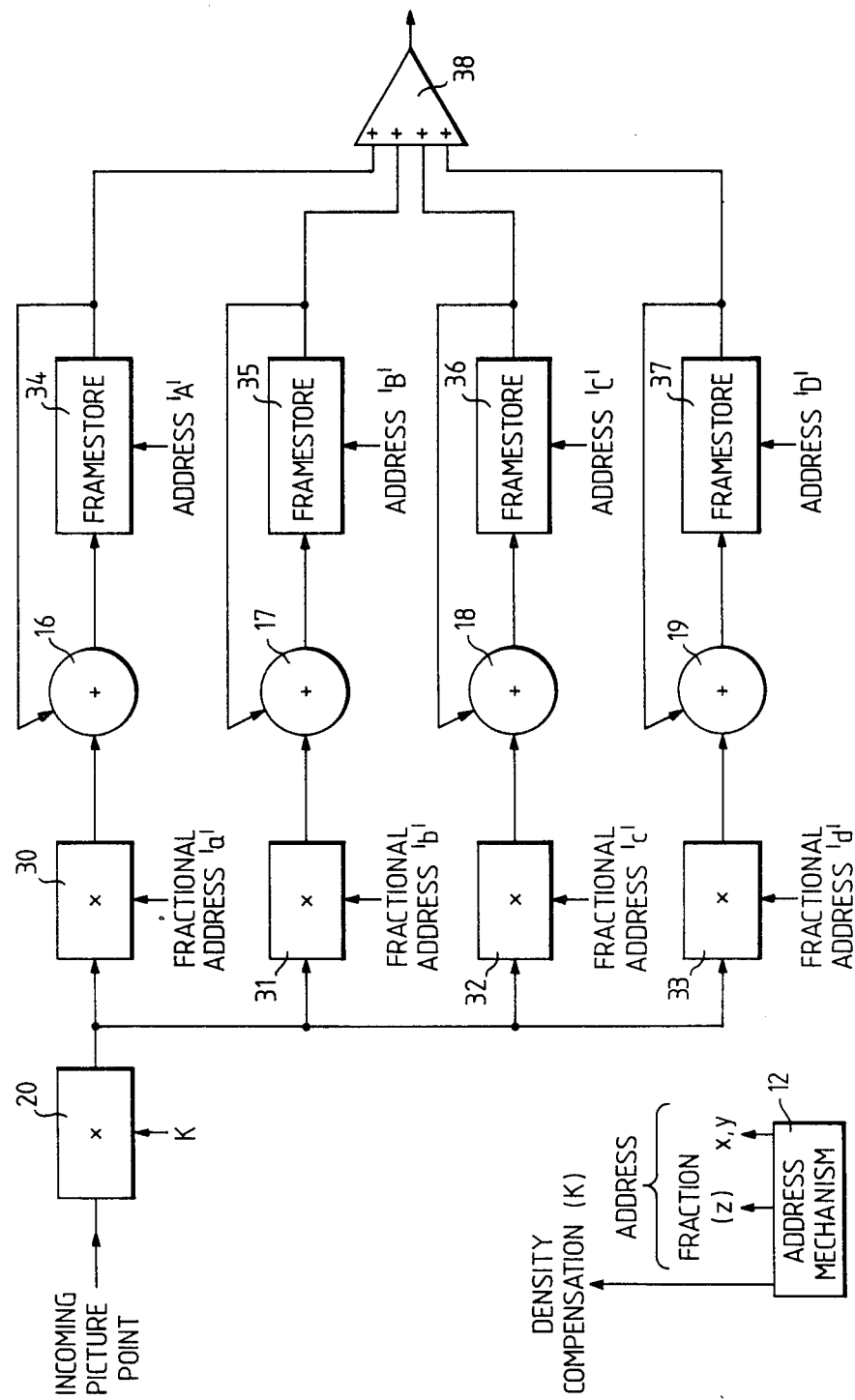
FIG. 4 shows further details of the processing.

Although FIG. 3 shows the basic mechanism involved, it has been somewhat simplified and more comprehensive system for producing the desired processing is shown in FIG. 4 and shows how the fractional part of the address and the density compensation referred to above is used. A multiplier 20 is now included to provide the density compensation. As illustrated in FIG. 2(b) a pixel may be manipulated so that four portions are allotted to each of four adjacent store cells. In order to cope with this manipulation at reasonable speeds it is typically necessary to include additional processing and storage over the mechanism as in FIG. 3 where the 4 points would have to be computed sequentially during one input pixel. The single multiplier, adder and framestore of FIG. 3 has been replaced by four framestores 34 to 37 each with their associated multipliers 30-33 and adders 16 to 19 respectively. The outputs from the framestores are received by summer 38 to produce the combined output. Such a system allows the incoming pixel to be available to each of the four relevant store cells and their associated processing. The address mechanism 12 is now shown as producing the main x, y address for the four respective framestores (A, B, C and D) and in addition the fractional (Z) part of the address (a, b, c, and d) and the density compensation value (K). The main address for pixel $P_1$ for any of the illustrated situations will be A=$C_1$, B=$C_2$, C=Cq and D=Cr. The fractions will vary. Thus for FIG. 2(a) a=1 and b, c and d=0, and K=1.

For FIG. 2(b) when dealing with $P_1$, the fractional addresses a, b, c, and d=$\frac{1}{4}$, and K=1. Any combination of these portions will always equal 1 due to the presence of summer 38.

For the FIG. 2(c) situation, for pixel $P_1$; a=1 and b, c and d=0 and K=$\frac{1}{2}$, for pixel $P_2$; A, B, C and D will be as before but a and b=$\frac{1}{2}$ and c and d=0 with K=$\frac{1}{2}$.

It is to be remembered that each store 34 to 37 is a complete framestore. Thus when writing into the system the addresses always express four different but adjacent cells, but on readout from the system, the address for each of the framestores is the same. In other words, for processing you want to access 4 cells, but on readout you only want to access a single cell.

The provision of multiplier 20, effectively reduces the incoming data, which is required where compression is taking place otherwise a build up of contributions from many picture points into a cell would give too large a density of information. For special effects the compression will not be the same for each cell within the frame.

For clarity multiplier 20 has been shown separate from multipliers 30-33 but in practice multiplier 20 could typically be incorporated within multiplier 30, 31, 32 and 33.

Figure 5:
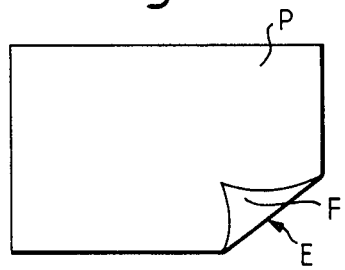
FIG. 5 shows a further aspect of picture manipulation.

Another special effect will now be described to illustrate the versatility of the system. FIG. 5 shows an effect equivalent to page P being turned. Merely generating the 'shape' you want allows the correct sequence of addressing to be achieved as well as the correction for the build up of the picture. Thus at the edge E of page P there will be a greater build up (but compensated by multiplier 20, than in the overlap portion F).

In practice the flap F will appear to be transparent so that picture information underneath will also be visible.

If it is desired to make the flap opaque so that the underlying picture is obscured this can be achieved by the operational cycle of read - replace - write, which can be simply produced by inhibiting the connection between the framestore 11 output and the adder 14 in the FIG. 3 configuration. Typically it is convenient to generate an identification 'tag' via the address mechanism to ensure that the system knows which area is above the other area.

Figure 6:
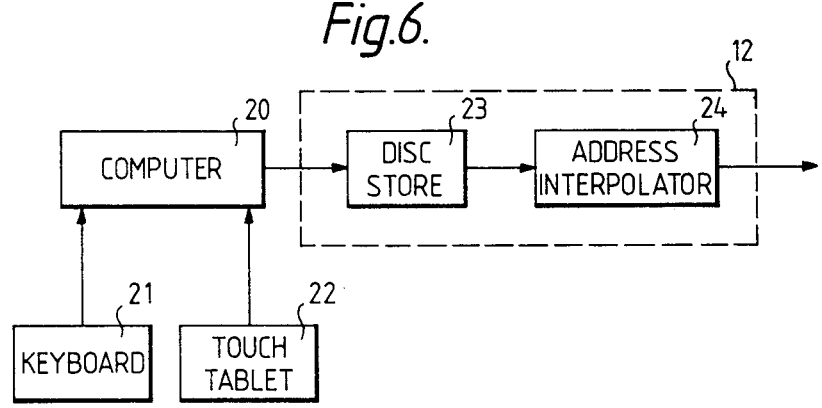
FIG. 6 shows a system capable of providing suitable address manipulation.

The way in which the address mechanism 12 can operate for any shape desired is now shown in more detail in FIG. 6.

It can be seen from the above examples that the address sequence chosen by the operator effectively defines the shape and size of the output picture as well as compensating for the accumulated information by the provision of x, y, z and K parameters.

The simple shapes of FIG. 2 can easily be generated by the keyboard 21 for input to computer 20 so as to provide the sequence of cell address locations desired to be accessed as well as entering the value of Z and K required.

Thus the grid of framestore cells can be determined to be within the boundary of the desired picture shape or not, when they are, these addresses are accessed during manipulation.

Alternatively, standard mathematical formulae can be entered to generate the desired shapes in the computer 20. In the case of a circle for example, the standard text book equation for the circle is entered and simply by defining the cell address of its centre and the circle radius, then it is possible to determine whether a particular cell address is within the boundaries of the circle or not, and this defines the resultant picture shape.

The desired shape area is also an indication of the compression relationship and so this also can be calculated to determine the K value. The value of compression (K) for a given picture area can be determined for example by employing standard area computational techniques (see p. 129–131 of Hewlett Packard HP25 handbook 1975) where K is proportioned to the area.

Figure 7:
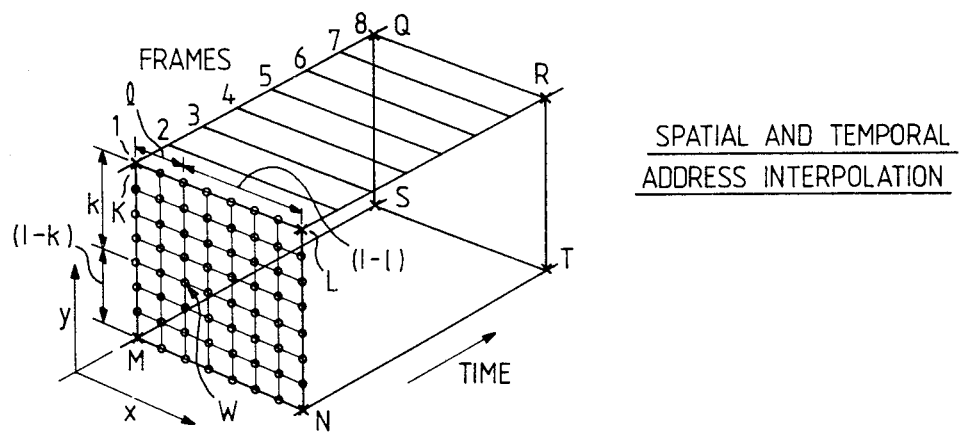
FIG. 7 shows address interpolation techniques for the system relating to a second aspect of the present invention.

The calculated values for x, y together with the appropriate value for K for that cell for a given shape are then passed to disc store 23. In practice disc 23 contains a whole range of shapes including shape sequences to allow picture transformation from one shape to another to be achieved. Once the shapes have been entered, the computer 20 is not necessarily required thereafter, and the system merely uses the disc store 23 as its shape data source. Although the disc access is much faster than that from the computer, it nevertheless is generally not rapid enough to cope with video rates of addressing. In order to overcome this problem we have incorporated an additional mechanism represented by address interpolator 24 which operates as illustrated in FIG. 7. The disc store in practice only holds coarse cell address data as shown by points K, L, M, N of which K and L represent typically the 1st and 8th successive pixel address horizontally and M and N the equivalent address points 8 lines below. Points Q, R, S and T are typically the equivalent address points 8 frames later. Thus updating the addressing at this rate can be handled by the disc and the addresses between the available points are interpolated therefrom both spatially and temporally as illustrated. We have found that this technique does not produce any noticeable degradation to the picture produced.

Although the computer 20 has been described as providing all the values for x, y, Z and K, where only coarse addresses are provided to disc 23, then it may be convenient to only provide correspondingly coarse values for the other parameters and then these also are interpolated to derive all the desired information. Alternatively, the parameters can be calculated following the address interpolation process within interpolator 24, using the computation referred to above.

The address interpolation technique also works where the disc is producing an effects sequence and whilst the change in addressing is produced by the disc updated every 8 frames (in this example), the address interpolation produces a gradual change over the 8 frames, by giving greater weighting to the adjacent frame than the remote frame.

Figure 8:
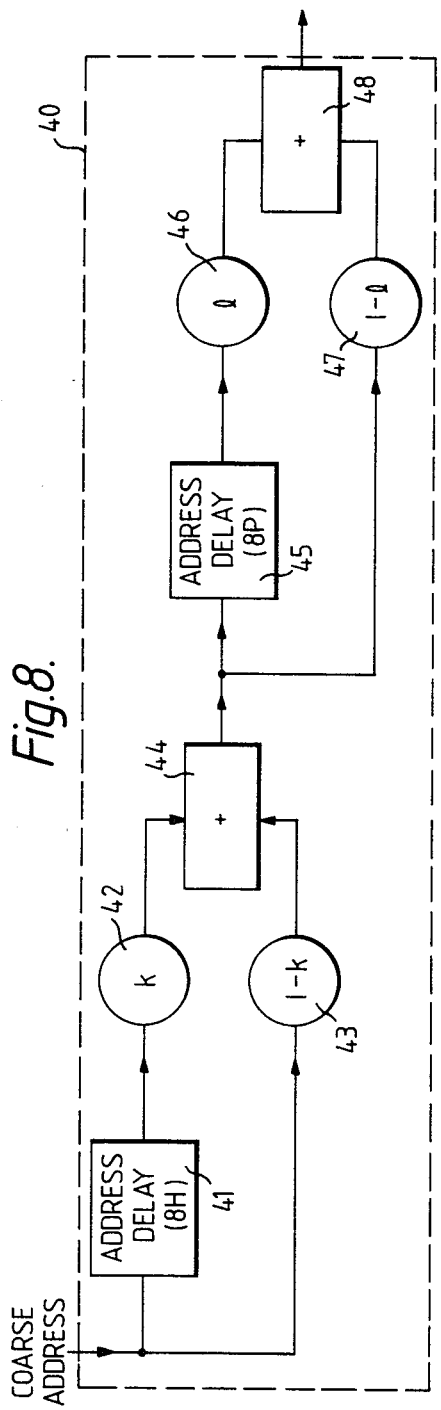
FIG. 8 shows an address interpolation configuration for dealing with the spatial manipulation.

An arrangement for providing the spatial address interpolation is shown in FIG. 8. The coarse addresses are received by address delay latch 41 which provides a delay equivalent to 8 lines of address. The delayed address is passed to multiplier 42 and the current coarse address is passed to multiplier 43 before addition in adder 44. The adder output passes to a further delay 45, which has a delay equivalent to 8 picture point addresses and this delayed output passes to multiplier 46. The undelayed output from adder 44 passes to multiplier 47 prior to receipt by adder 48, which also receives the output from multiplier 46.

The FIG. 8 arrangement in practice is duplicated to give the necessary interpolation for both the x and y address.

Thus from FIG. 7, as the K, L, M, N coarse addresses are available, any other interpolated address e.g., address W can be determined therefrom. The value of k and l will vary between 0 and 1 typically in $\frac{1}{8}$ steps as the addresses are calculated. These values for the multipliers can conveniently be provided by look up tables incremented by the address clocks.

Figure 9:
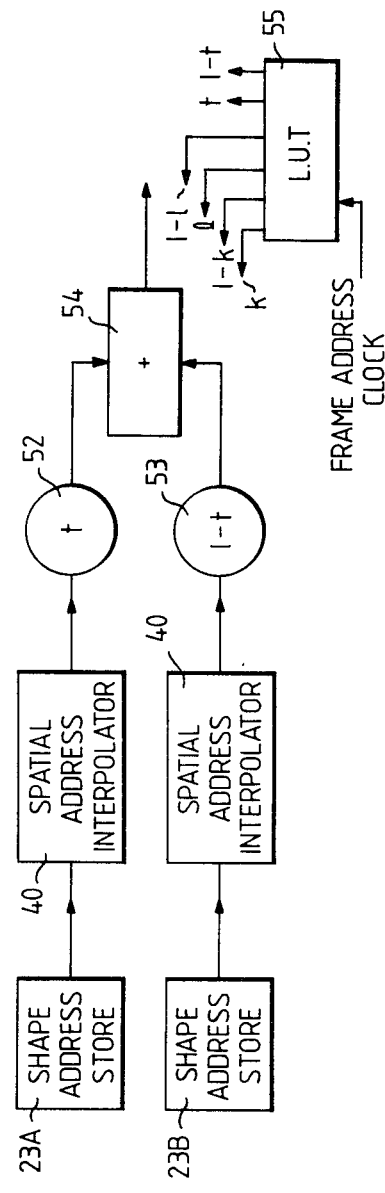
FIG. 9 shows an arrangement for both spatial and temporal interpolation of the addresses.

The spatial address interpolator is incorporated in the FIG. 9 arrangement to produce the temporal interpolation. The output from the disc store 23 is for ease of explanation shown as being provided from a first shape store 23A (holding the KLMN addresses of FIG. 7 for example) and a second shape store 23B (holding the QRST values). After spatial interpolation, the address values are then available for temporal interpolation usings multipliers 52 and 53. The resultant outputs are available via adder 54. The values for t again vary between 0–1 in $\frac{1}{8}$ steps, conveniently using a look up table 55. This allows any change in address shape between the 8 frame period to be gradually introduced.

Although the system has been described as having coarse addresses operating around 8 addresses and 8 frames, this value is not mandatory.

In practice although the system has been generally described in relation to handling intensity values for the video information, when handling colour data the system would typically be triplicated so that one part handles the luminance data and the other part the chrominance (e.g., colour difference) information. In the N.T.S.C. system this is coded as Y, I and Q information respectively. From this is can be seen that although a relatively large number of framestores are needed, the results obtained justify such a configuration.

Alternatively the colour can be handled on a RGB basis.

Although the system has been described for use in special effects for broadcast T.V. it can be used for other types of video systems requiring picture manipulation in a total free form after generation.

We claim:

1. A video processor for picture manipulation comprising:
   input means for providing a sequence of picture point signals representing an input picture;
   storage means for receiving picture point signals in a plurality of locations representing spaced picture points on spaced lines of an input picture;
   a store for address signals identifying selected locations in said storage means;
   said selected locations being less numerous than the picture points of said input picture;

means for reading said address signals at a lower rate than that at which said input picture point signals are provided;

means for interpolating among groups of said address signals to provide a respective address signal for each of the input picture point signals;

means for writing said input picture point signals in the locations represented by the respective address signals, and means for reading the picture point signals from said locations in sequence to provide output picture point signals representing said input picture with a manipulation determined by said address signals.

2. A processor according to claim 1, wherein said store for address signals comprises means for providing different address signals for different pictures separated by more than one picture in a sequence of input pictures and said interpolating means comprises means for interpolating address signals for input picture signals occurring in successive pictures.

3. A video processing system comprising:
a frame store;
input means for receiving sequences of picture point signals defining successive pictures;
address means for determining selected addresses in said frame store for picture point signals separated by more than one picture point;
said address means being operative to provide said selected addresses for pictures separated by more than one picture;
address interpolation means for interpolating picture point addresses not determined by said address means in successive pictures including said separated pictures and including intermediate pictures, and means for writing picture point signals in a predetermined order into said frame store means.

4. A system as in claim 3, wherein said address determining means includes a memory for retaining at least one sequence of addresses.

5. A system as in claim 4, wherein said memory comprises a movable recording medium containing only said selected frame store addresses for said separated pictures.

6. A system as in claim 4, including generator means to determine desired sequence of addresses prior to their receipt by said memory.

7. A system as in claim 3, wherein said address interpolation means includes:
a spatial address interpolator for making available interpolated picture point addresses in two separated pictures; and
a temporal address interpolator responsive to the spatial address interpolator for interpolating picture point addresses in pictures intermediate said two separated pictures.

8. A system as in claim 7, wherein said spatial address interpolator includes a processor for providing interpolating coefficients dependent on the spatial relationship of the respective picture points.

9. A system as in claim 8, wherein said temporal address interpolator includes a processor for providing interpolation coefficients dependent on the time separation of the respective pictures.

10. A method of providing addresses for a frame store processing system comprising the steps of:
providing only selected ones of the desired frame store addresses required to be addressed, and updating the selected ones of the desired address at a rate slower than a normal picture rate;
calculating all the desired addresses to be accessed by interpolating from the selected addresses in spatial and temporal modes so that all the addresses to be accessed are available updated at said normal rate.

11. A video processor for picture manipulation comprising:
input means for providing a sequence of picture point signals representing an input picture;
first storage means for receiving picture point signals in a plurality of locations representing picture points on lines of an input picture;
means including second storage means for predetermined address signals identifying selected locations in said first storage means for said picture point signals;
means for reading from said second storage means address signals concommitantly with the provision of said input picture point signals by said input means;
means for writing said input picture point signals in locations of said first storage means determined by respective address signals;
and means for reading the picture point signals from said locations of said first storage means in sequence to provide output picture point signals representing said input picture with a manipulation determined by said address signals.

12. A video processor according to claim 11, wherein said second storage means is arranged to store address signals identifying selected locations in said first storage means, which are less numerous than the picture points on said input picture, and means are provided for interpolating among said address signals to provide address signals for each of said input picture points.

* * * * *